US011357253B2

(12) United States Patent
Toubeaux

(10) Patent No.: US 11,357,253 B2
(45) Date of Patent: Jun. 14, 2022

(54) CITRUS JUICER COMPRISING A MEMBRANE

(71) Applicant: SARL JNIUS, Armentieres (FR)

(72) Inventor: Jean François Toubeaux, Le Maisnil (FR)

( * ) Notice: Subject to any disclaimer, the term of this patent is extended or adjusted under 35 U.S.C. 154(b) by 375 days.

(21) Appl. No.: 16/084,254

(22) PCT Filed: Mar. 14, 2017

(86) PCT No.: PCT/FR2017/050576
§ 371 (c)(1),
(2) Date: Sep. 12, 2018

(87) PCT Pub. No.: WO2017/158278
PCT Pub. Date: Sep. 21, 2017

(65) Prior Publication Data
US 2019/0069591 A1    Mar. 7, 2019

(30) Foreign Application Priority Data

Mar. 14, 2016 (FR) ...................................... 1652107

(51) Int. Cl.
| A23N 1/00 | (2006.01) |
| A47J 19/02 | (2006.01) |
| B30B 9/22 | (2006.01) |

(52) U.S. Cl.
CPC .............. *A23N 1/003* (2013.01); *A47J 19/02* (2013.01); *B30B 9/22* (2013.01); *B30B 9/225* (2013.01)

(58) Field of Classification Search
None
See application file for complete search history.

(56) References Cited

U.S. PATENT DOCUMENTS

| 2,274,306 A | 2/1942 | Smith |
| 2,414,053 A | 1/1947 | McCarthy |
| 2,420,680 A | 5/1947 | Pipkin |
(Continued)

FOREIGN PATENT DOCUMENTS

| CN | 101198273 A | 6/2008 |
| CN | 203468274 U | 3/2014 |
(Continued)

OTHER PUBLICATIONS

Introduction of Packaging Machinery edited by Sun Fenglan, etc, pp. 145-146, Printing Industry Press, Jun. 1998.
(Continued)

*Primary Examiner* — Jimmy Chou
(74) *Attorney, Agent, or Firm* — Robert Facey; Adam Lewental

(57) ABSTRACT

The invention provides a citrus juicer (100) comprising:
- an enclosure (20) defining a cavity (24) for produce for pressing (10) containing a fluid, and an opening for introducing the produce for pressing into the cavity;
- a cannula (50) for engaging in the produce for pressing, a second portion (54) arranged outside the cavity, and a through opening (58) extending between the first and second portions;
- an inflatable extensible membrane (80) for compressing the produce for pressing engaged on the first end of the cannula in order to extract the fluid out from the cavity; and
- an ejector device for discharging the pressed produce.

27 Claims, 14 Drawing Sheets

(56) References Cited

U.S. PATENT DOCUMENTS

| | | | | |
|---|---|---|---|---|
| 2,705,452 | A * | 4/1955 | Johnson | A47J 19/02 100/98 R |
| 2,848,939 | A * | 8/1958 | Warner | A47J 19/02 100/108 |
| 3,144,064 | A * | 8/1964 | Polk, Jr. | A23N 4/18 269/22 |
| 3,736,865 | A * | 6/1973 | Hait | A23N 1/003 100/98 R |
| 3,807,297 | A * | 4/1974 | Marrie | A47J 19/023 100/116 |
| 3,831,515 | A * | 8/1974 | Breton | A23N 1/003 100/37 |
| 3,866,528 | A * | 2/1975 | Montagroni | A23N 1/003 99/495 |
| 4,154,163 | A * | 5/1979 | Niemann | A23N 1/003 100/108 |
| 4,309,944 | A * | 1/1982 | Frost, Jr. | A23N 1/003 100/104 |
| 4,896,591 | A | 1/1990 | Bertrand | |
| 4,917,007 | A * | 4/1990 | Nelson | A23N 1/003 100/108 |
| 4,922,814 | A * | 5/1990 | Anderson | A23N 1/003 100/108 |
| 4,977,826 | A * | 12/1990 | Kock | A23L 2/06 99/516 |
| 5,075,122 | A | 12/1991 | Barron | |
| 5,199,348 | A * | 4/1993 | Cimenti | A23N 1/003 100/125 |
| 5,320,032 | A * | 6/1994 | Cimenti | B30B 9/02 100/125 |
| 5,331,887 | A * | 7/1994 | Beck | A23N 1/003 100/105 |
| 5,339,729 | A * | 8/1994 | Anderson | A23N 1/00 99/509 |
| 5,824,000 | A * | 10/1998 | Pavlo | A61M 5/1483 604/142 |
| 6,089,147 | A * | 7/2000 | Rodriguez | B30B 9/04 100/37 |
| 6,161,475 | A * | 12/2000 | Coppelletti | A23N 1/003 100/282 |
| 6,186,057 | B1 * | 2/2001 | Cremades Del Toro | A47J 19/027 100/213 |
| 6,293,189 | B1 * | 9/2001 | Evans | A23N 1/003 100/108 |
| 7,086,328 | B1 * | 8/2006 | Mendes | A23N 1/003 100/108 |
| 7,628,108 | B2 * | 12/2009 | Neto | A23N 1/003 100/108 |
| 7,779,756 | B2 * | 8/2010 | Klipp | A23N 1/003 100/213 |
| 8,047,130 | B2 * | 11/2011 | Neto | A23N 1/003 99/510 |
| 8,082,841 | B2 | 12/2011 | Horche Trueba et al. | |
| 9,451,844 | B2 | 9/2016 | Olucha Soler | |
| 2005/0139093 | A1 * | 6/2005 | Nelson | B30B 9/06 100/37 |
| 2007/0107608 | A1 * | 5/2007 | Holcomb | A47J 19/023 99/495 |
| 2010/0058938 | A1 * | 3/2010 | Rivera | A47J 19/023 99/495 |
| 2013/0340632 | A1 * | 12/2013 | Contell Albert | A23N 1/003 99/507 |
| 2014/0190359 | A1 * | 7/2014 | Corkin | A23N 1/003 99/511 |
| 2014/0262669 | A1 * | 9/2014 | Conti | A47J 19/00 192/56.61 |

FOREIGN PATENT DOCUMENTS

| | | |
|---|---|---|
| DE | 19641919 A1 | 4/1998 |
| GB | 2158697 A | 11/1985 |
| WO | 2009044103 A1 | 4/2009 |

OTHER PUBLICATIONS

Translation of pp. 3 and 4 of Introduction of Packaging Machinery edited by Sun Fenglan, etc, pp. 145-146, Printing Industry Press, Jun. 1998.

* cited by examiner

CITRUS JUICER COMPRISING A MEMBRANE

BACKGROUND

The present disclosure relates to a citrus juicer. A particular application lies in preparing juice from fruits or vegetables, e.g. in a restaurant or in a home context.

Manual citrus juicers are known that include a frustoconical portion against which a portion of the fruit can be pressed in order to extract juice therefrom.

Nevertheless, such devices require large efforts on the part of the user, while also being messy, in particular because of splashes of juice; as a result, using them also requires the user to spend considerable time, both in operations before using them such as cutting up fruit, and also in operations after using them, such as cleaning the device and the surroundings in which it was used.

Citrus juicers that are partially automatic are also known, thereby enabling the efforts required from the user to be limited.

Such a citrus juicer is proposed in particular in Document WO 2009/044103, which describes a citrus juicer comprising:

an enclosure having a wall defining a cavity for a fruit, and an opening formed in the wall for inserting the fruit into the cavity; and a cannula extending through the wall of the enclosure, the cannula having a first portion arranged inside the cavity in order to be engaged inside the fruit, and a second portion arranged outside the cavity, the cannula also having a through opening extending between the first and second portions.

The wall includes a floor configured to be moved towards a ceiling through which the cannula extends. Once a fruit has been placed in the cavity, the floor is moved towards the ceiling while the cannula is moved vertically downwards, so that the fruit is engaged on the first portion of the cannula in order to extract juice.

Although such a device limits the efforts deployed by the user, it does not enable all of the juice contained in the fruit to be extracted. In addition, it is particularly complex to fabricate, specifically because of the synchronized movements of the floor and of the cannula through the ceiling, such that it is not completely satisfactory.

SUMMARY

The present disclosure has the object, among others, of resolving the above-described shortcomings of citrus juicers known in the prior art by proposing a citrus juicer that makes extracting the fluid contained in produce for pressing easy, quick, and effective.

This object is achieved by the fact that embodiments of the disclosure provide a citrus juicer having a cavity for fluid-containing produce for pressing, the citrus juicer further comprising:

an extensible membrane arranged in the cavity and extending over all or part of the wall so as to surround the produce for pressing arranged inside the cavity; and inflation means configured to inflate the extensible membrane so as to compress the produce for pressing engaged on the first portion of the cannula in order to extract the fluid out from the cavity via the internal duct of the cannula;

a lid shaped to close the opening so as to close the cavity, the lid being movable between an open position in which the enclosure is open and a closed position in which the opening is closed by the lid; and an ejector device for discharging the pressed produce out from the cavity.

The presence of the extensible membrane thus makes it possible to compress the produce for pressing in a manner that is simple and effective in order to extract the fluid out from the cavity. The inflation means are configured in particular to adapt the volume of the extensible membrane to the dimensions and to the strength of the produce for pressing, while also serving to exert effective and well-controlled pressure on the produce for pressing. In particular, the volume of the extensible membrane may be adapted so as to avoid tearing the outside surface of the produce for pressing, such as the skin of an orange, since such a tear runs the risk of changing the taste of the fluid that is extracted therefrom through the cannula.

In addition, since the fluid is extracted directly out from the cavity, the inside volume of the cavity is not soiled by the fluid, thereby considerably reducing the need for cleaning operations.

Since the wall of the enclosure does not have portions that are movable relative to one another, unlike citrus juicers made in the prior art, fabrication of the citrus juicer is simplified, its cost is reduced, and its maintenance made easier. In addition, its overall size is limited compared with partially-automatic citrus juicers known in the prior art, such as the above-mentioned citrus juicer, so that it is particularly suited for home use.

The cannula is also provided with one or more orifices enabling the fluid from the produce for pressing to flow in the internal duct.

The presence of the lid makes it possible to keep the produce for pressing effectively and securely inside the cavity in order to facilitate extracting its fluid out from the cavity. By contributing to compressing the produce for pressing, the lid also participates in the effectiveness with which its fluid is extracted.

In addition, the lid makes it possible to limit any splashes that might soil the surroundings where the citrus juicer of the present disclosure is located.

Advantageously, the lid also has the function of pushing the produce for pressing so that it becomes engaged on the cannula. It can be understood that this pushing takes place as the lid moves from its open position to its closed position.

Advantageously, the citrus juicer includes a motor-driven device for moving the lid between its open position and its closed position, so as to facilitate introducing the produce for pressing into the enclosure.

Furthermore, the advantage of the ejector device is to make it easier to remove the pressed produce after the fluid has been extracted.

The ejector device is preferably motor-driven.

The citrus juicer further includes control means for controlling the movement of the lid and of the ejector device.

Advantageously, the wall comprises a peripheral partition and a bottom, the cannula extending through the bottom.

By this provision, fluid is extracted out from the produce for pressing easily by gravity. In addition, the design of the citrus juicer of the present disclosure is further simplified.

Blocking means could be provided on the inside surface of the lid, i.e. on the surface of the lid that faces towards the cavity when the lid covers the opening, which blocking means could be configured to co-operate with the produce for pressing so as to keep it in the cavity, in particular while the extensible membrane is being inflated.

By way of non-limiting example, said blocking means may be of a shape that is configured to co-operate with the shape of the produce for pressing.

Preferably, the cavity is substantially cylindrical in shape. In another variant, the cavity may be substantially spherical in shape.

The shape of the cavity is thus particularly well adapted to produce for pressing that is spherical or cylindrical in shape, such as oranges, lemons, grapefruit, or any other fruit or vegetable.

Advantageously, the cannula presents a longitudinal direction and the lid is movable along the longitudinal direction of the cannula. This longitudinal direction is parallel to the axis of the enclosure when the enclosure is cylindrical.

Advantageously, the extensible membrane comprises a body of substantially cylindrical shape configured to surround the produce for pressing when it is arranged inside the cavity.

The shape of the body of the extensible membrane is also particularly well adapted to produce for pressing that is cylindrical or spherical in shape, and contributes to the ease and the effectiveness with which fluid is extracted therefrom.

Advantageously, the extensible membrane, when inflated, presents a section that is not constant, being shaped to match the shape of the produce for pressing.

By matching closely the shape of the produce for pressing, the extensible membrane enables the fluid to be extracted effectively without degrading the produce, and in particular without running the risk of puncturing its skin.

Preferably, the wall includes a peripheral partition and the extensible membrane comprises an inflatable portion extending over all or part of the peripheral partition.

The presence of the inflatable portion contributes to the effectiveness with which the produce for pressing is compressed, and consequently to the effectiveness with which its fluid is extracted. Furthermore, since it is arranged over all or part of the peripheral partition, it does not compromise co-operation between the produce and the cannula that extends, by way of non-limiting example, from the bottom of the wall, nor does it compromise introducing the produce for pressing through the opening formed in the wall.

In an optional embodiment, the extensible membrane comprises at least two inflatable portions configured to extend over two distinct portions of the peripheral partition of the wall.

The presence of two distinct portions further improves the matching of the extensible membrane to the dimensions of the produce for pressing. In addition, assuming that the two portions are not in fluid flow communication with each other, and in the event of one of the two portions failing, e.g. as a result of being perforated, the operation of the citrus juicer of the present disclosure is not compromised.

Advantageously, the citrus juicer further includes fluid admission means for admitting a fluid such as water in order to introduce said fluid into the cavity.

Introducing a fluid such as water into the cavity serves to facilitate cleaning operations after the citrus juicer has been used.

In an optional embodiment, the same fluid is used initially for inflating the extensible membrane so as to extract the fluid contained in the produce for pressing, and subsequently for participating in cleaning the cavity. By means of this provision, the environmental impact of the citrus juicer of the present disclosure is reduced significantly, as is its operating cost.

Advantageously, the citrus juicer further includes an ultrasound emitter device configured to emit ultrasound into the fluid contained in the cavity so as to clean said cavity.

The presence of the device serves to further improve and facilitate operations of cleaning the citrus juicer, and more particularly its cavity.

The use of fluid admission means for admitting fluid into the cavity, possibly combined with the ultrasound emitter device, thus makes the citrus juicer particularly suitable for commercial use or in the context of a canteen, where hygiene constraints are particularly strict.

Advantageously, the cannula presents a longitudinal axis, the citrus juicer further including rotation means configured to cause the cannula to turn about its longitudinal axis.

Turning the cannula about its longitudinal axis contributes to making the extraction of fluid from the produce for pressing even easier and more effective. When extracting juice from a fruit, it serves to facilitate introducing the first portion of the cannula into the flesh of the fruit and to cut up that flesh so as to facilitate extracting the juice.

Preferably, the first portion of the cannula has an outside surface, the cannula further including a projection extending on the outside surface of the first portion.

In a preferred embodiment, the projection is substantially helical in shape.

The presence of the projection and its shape contribute once more to making the extraction of fluid from the fruit for pressing easier and more effective.

Advantageously, the ejector device includes a movable base that is movable along the longitudinal axis of the cannula. The longitudinal axis of the cannula is preferably parallel to the axis of the enclosure when the enclosure is cylindrical.

Preferably, the movable base comprises an annular tray arranged to surround the cannula. It can be understood that the tray includes a central hole through which the cannula passes when the tray moves along the longitudinal axis of the cannula. One advantage is to be able to push the pressed produce effectively towards the opening of the enclosure in order to discharge it out from the enclosure.

Advantageously, the citrus juicer of the disclosure further includes a mover device for moving the lid together with the movable base of the ejector device in a direction parallel to the longitudinal axis of the cannula.

An advantage is to automate discharging the pressed produce out from the cavity, with opening of the lid being accompanied by the movement of the movable base. Furthermore, this configuration makes it possible to automate introducing the produce for pressing into the enclosure and then closing it. For this purpose, closure of the lid is accompanied by the movable base moving towards the bottom of the cylinder.

It can thus be understood that the ejector device is located between the bottom of the enclosure and the lid.

Advantageously, the mover device is configured so that the movable base is arranged at the bottom of the cavity when the lid is in the closed position, while the movable base is arranged at or above the opening when the lid is in the open position.

Advantageously, the citrus juicer of the disclosure further includes a discharge outlet for discharging the pressed produce and a discharge device for discharging the pressed produce to the discharge outlet after it has been pressed.

Preferably, the citrus juicer further includes a removable container for receiving the pressed produce, and the discharge outlet communicates with said container.

An advantage is to automate ejecting the pressed produce out from the enclosure and discharging it to the container.

Advantageously, the discharge device comprises an arm arranged to pivot between a first position and a second position.

Preferably, the discharge device includes a motor-driven mover member to cause the arm to pivot between its first and second positions.

Preferably, the discharge device further comprises an abutment configured to block the discharge outlet when the arm is in the first position, said abutment being retracted when the arm is in the second position.

It can be understood that the abutment serves to ensure that the produce for pressing introduced by the user into the citrus juicer becomes correctly positioned on the ejector device without dropping into the container.

Advantageously, the cannula extends axially outside the enclosure beyond the opening.

Under such circumstances, the lid preferably includes a setback shaped to receive the first portion of the cannula when the lid is in the closed position.

An advantage is to maximize the area of the wall of the cannula that is in contact with the flesh of the produce for pressing.

In order to facilitate penetration of the cannula into the produce for pressing, the top end of the first portion of the cannula is bullet-shaped.

Advantageously, the ejector device presents a reception position for receiving produce for pressing introduced into the citrus juicer, at least a portion of the ejector device, e.g. the tray, being arranged outside the enclosure when the ejector device is in the reception position.

When the user introduces the produce for pressing into the citrus juicer, the ejector device is in a reception position so as to receive and carry the produce for pressing. The ejector device accompanies the movement of the produce for pressing towards the enclosure while the lid is closing. As it closes, the lid pushes the produce for pressing, thereby engaging the produce for pressing on the cannula.

Advantageously, the citrus juicer of the disclosure further comprises a pivoting introduction device for introducing the produce for pressing into the body of the citrus juicer.

Preferably, the introduction device comprises a hopper that pivots about an axis perpendicular to the longitudinal axis of the cannula.

Embodiments of the disclosure also provide a citrus juicer comprising:
- an enclosure having a wall defining a cavity fluid-containing produce for pressing, and an opening formed in the wall in order to introduce the produce for pressing into the cavity, the cavity being cylindrical and presenting an axis;
- a lid shaped to close the opening, so as to close the cavity;
- a cannula extending through the wall of the enclosure, the cannula having a first portion arranged inside the cavity and configured to be engaged in the produce for pressing, and a second portion arranged outside the cavity, the cannula further including an internal duct extending between the first and second portions, the cannula having a longitudinal axis that is parallel to the axis of the cavity; and
- an extensible membrane arranged inside the cavity and extending over all or part of the wall in such a manner as to surround the produce for pressing when it is arranged inside the cavity, and inflation means configured to inflate the extensible membrane so as to compress the produce for pressing engaged on the cannula in order to extract the fluid out from the cavity via the internal duct of the cannula.

Preferably, the longitudinal axis of the cannula substantially coincides with the axis of the cavity.

The method of pressing out fruit juice by means of a citrus juicer of the present disclosure is as follows:
- introducing the fruit into the cavity through the opening;
- engaging the fruit on the first portion of the cannula; and
- actuating the inflation means for inflating the extensible membrane so as to compress the fruit in order to extract juice from the fruit via the internal duct in the cannula.

The operation consisting in pressing fruit by means of a citrus juicer according to embodiments of the present disclosure is thus particularly easy and effective, and does not require significant effort on the part of the user.

BRIEF DESCRIPTION OF THE DRAWINGS

Other characteristics and advantages of the disclosure appear more clearly and completely on reading the following description of a preferred embodiment, given by way of non-limiting example and with reference to the accompanying drawings, in which.

DETAILED DESCRIPTION

Figure 1:
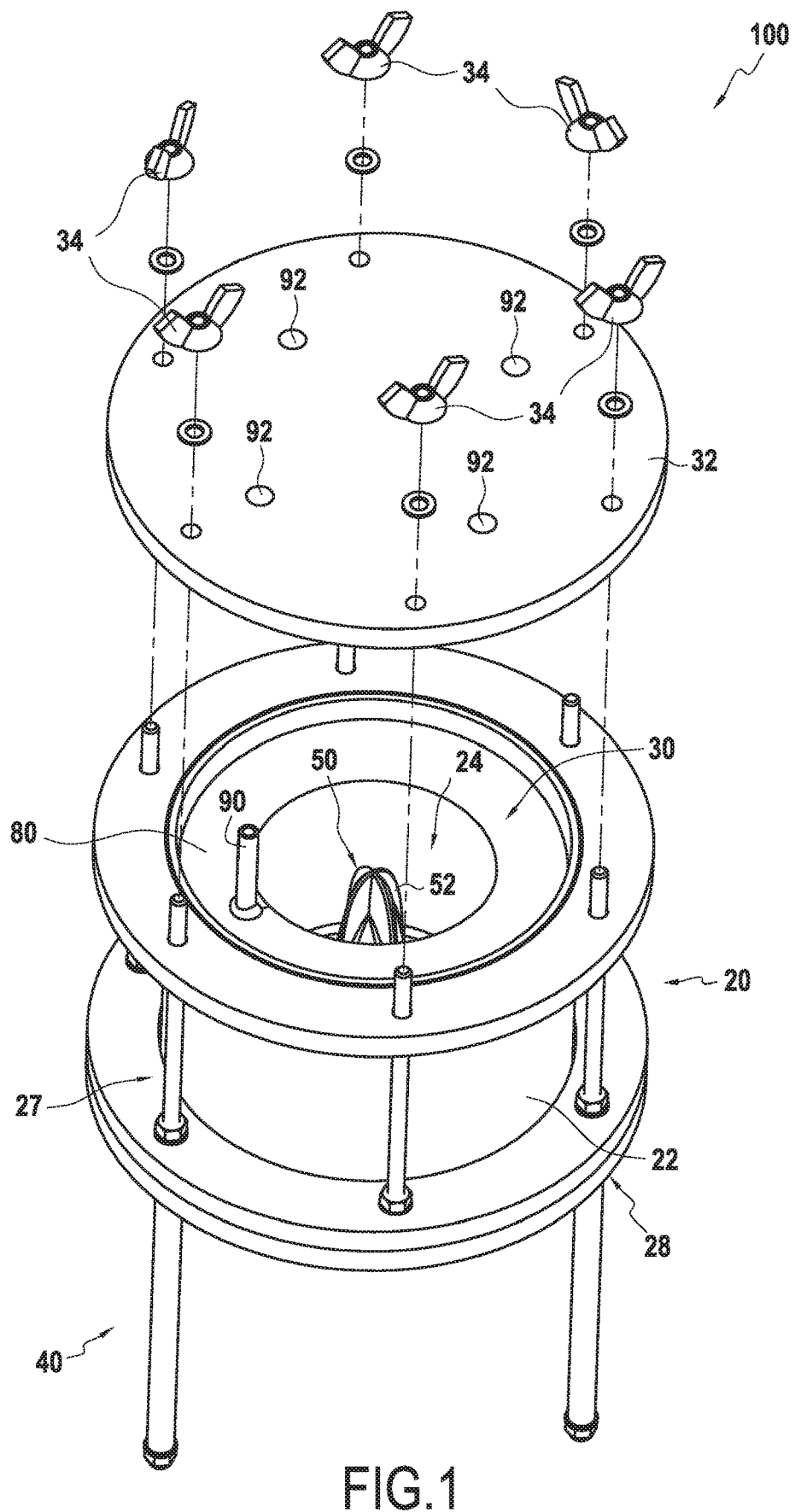
FIGS. 1 and 2 are diagrams showing an example citrus juicer of the present disclosure in perspective views respectively from above and from below.
Figure 2:
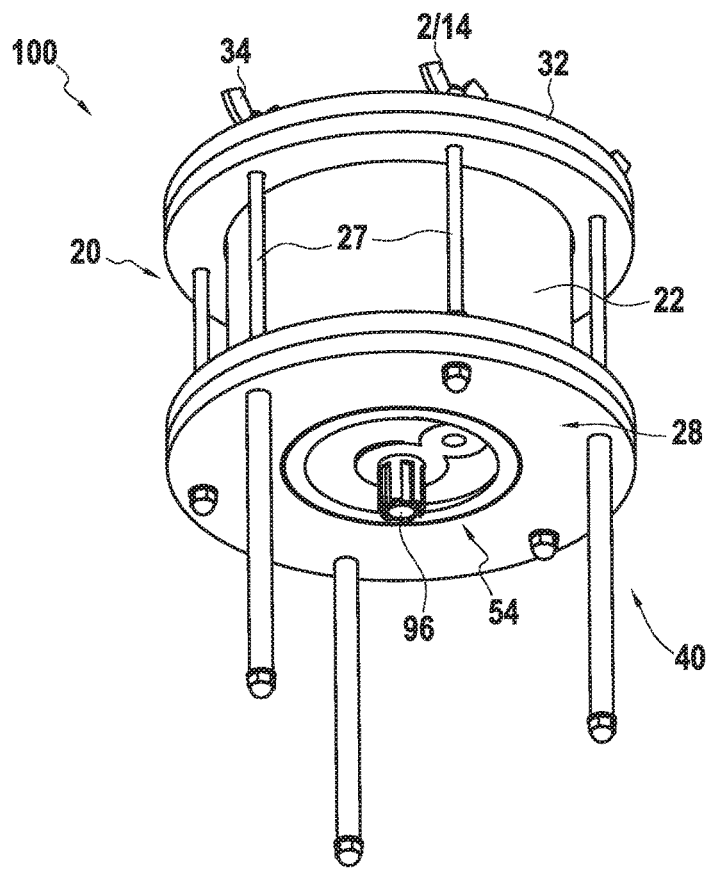

In the example shown in FIGS. 1 to 5, the citrus juicer 100 of the present disclosure comprises an enclosure 20 having a wall 22 defining a cavity 24.

By way of non-limiting example, the cavity 24 presents a shape that is substantially cylindrical.

By way of non-limiting example, the enclosure 20 includes an opening 30 formed in its top end together with a lid 32 shaped to cover the opening 30 so as to close the cavity 24.

The enclosure 20 also has closure means 34 configured to hold the lid 32 against the opening 30. In the example shown in FIGS. 1 to 5, the closure means 34 comprise butterfly nuts; naturally, it would be possible without going beyond the ambit of the present disclosure to devise any other type of closure means 34.

The wall 22 of the enclosure 20 includes a peripheral partition 26 and a bottom 28.

Figure 7:
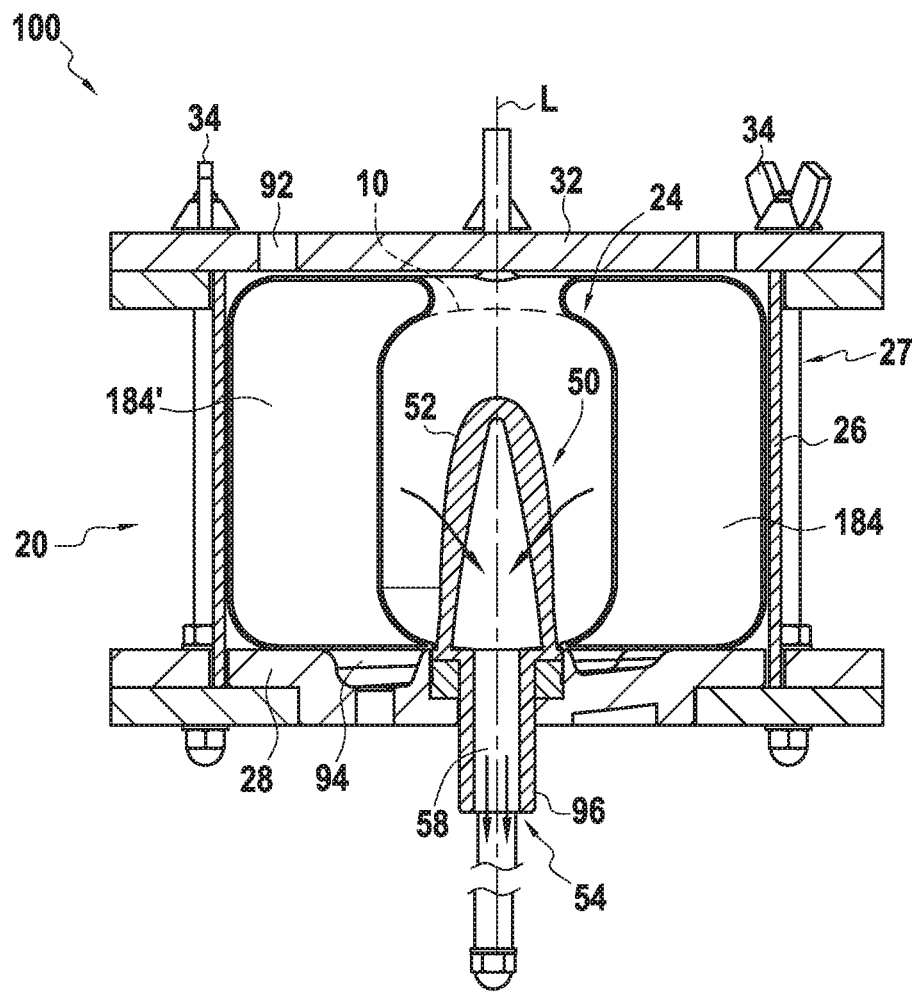
FIG. 7 is a diagrammatic section view of another example citrus juicer of the present disclosure, the extensible membrane being in an inflated state.

In the example shown in FIGS. 1 to 5, and likewise in the example shown in FIG. 7, the enclosure 20 also has stiffener elements 27 extending along the peripheral partition 26 and configured to stiffen the cavity 24. The stiffener elements are thus configured to maintain the substantially cylindrical shape of the cavity 24.

The enclosure 20 of the citrus juicer 100 of the present disclosure is thus configured so that its cavity 24 can receive produce 10 for pressing such as an orange, a lemon, any other fruit or vegetable, said produce for pressing containing a fluid.

By way of non-limiting example, the citrus juicer 100 also has a cannula 50 extending through the bottom 28 of the wall 22.

The cannula 50 has a longitudinal axis L; by way of non-limiting example, the longitudinal axis L of the cannula 50 extends substantially parallel to the axis of the cylindrical shape defined by the cavity 24. Preferably, the axes coincide.

Furthermore, the cannula 50 has first and second longitudinal portions 52 and 54, the first portion 52 being arranged inside the cavity 24 and configured to be engaged in the produce for processing 10 when the produce for pressing is arranged in the cavity 24. The second portion 54 of the cannula 50 is arranged outside the cavity 24.

The cannula 50 also has a through opening 58 comprising an internal duct extending in the first and second longitudinal portions 52 and 54, for a purpose that is described more clearly below.

The citrus juicer 100 also has an extensible membrane 80 arranged inside the cavity 24 and extending over the wall 22 in such a manner as to surround the produce for pressing 10 when it is arranged in the cavity 24.

The extensible membrane 80 comprises a body 82 of shape that is substantially cylindrical, by way of non-limiting example.

The extensible membrane 80 also has inflatable portions 84, 84' that may either be joined to each other in order to form a single inflatable portion or else be distinct from each other and separated so that they are not in fluid flow communication with each other. Without going beyond the ambit of the present disclosure, it is possible to devise a citrus juicer in which the extensible membrane has more than two inflatable portions, potentially in fluid flow communication with one another.

The citrus juicer 100 also includes inflation means 90 configured to inflate the extensible membrane 80.

Figure 3:
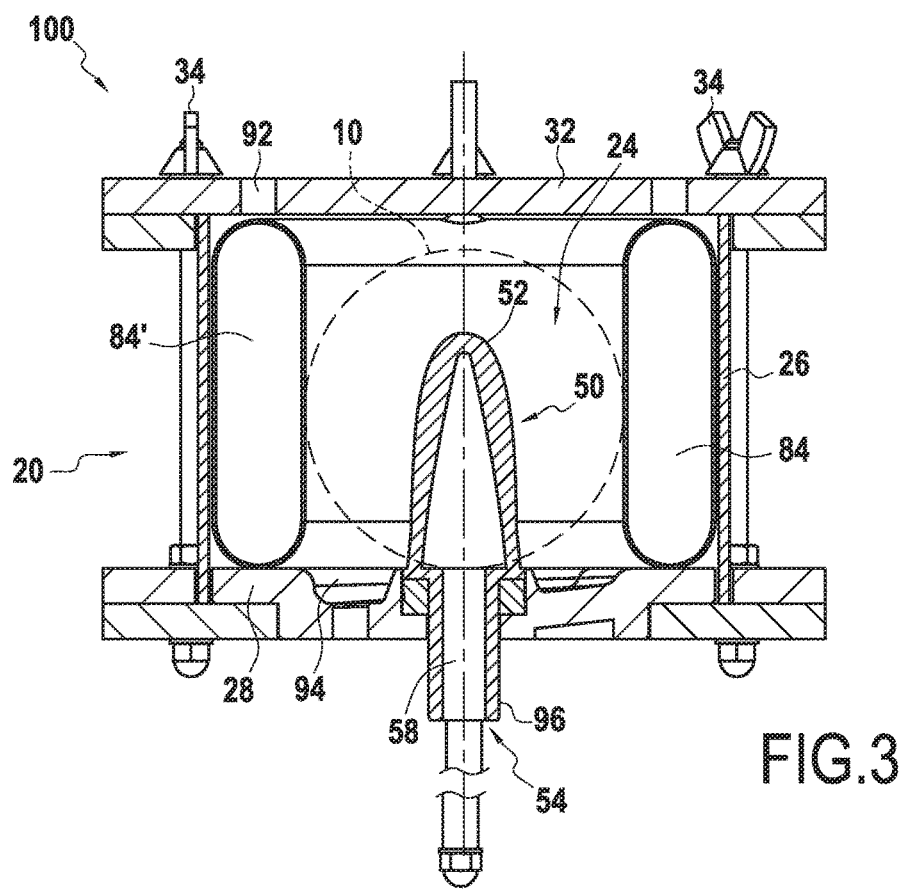
FIG. 3 is a diagrammatic section view of an example citrus juicer of the present disclosure, the extensible membrane being in a deflated state.
Figure 4:
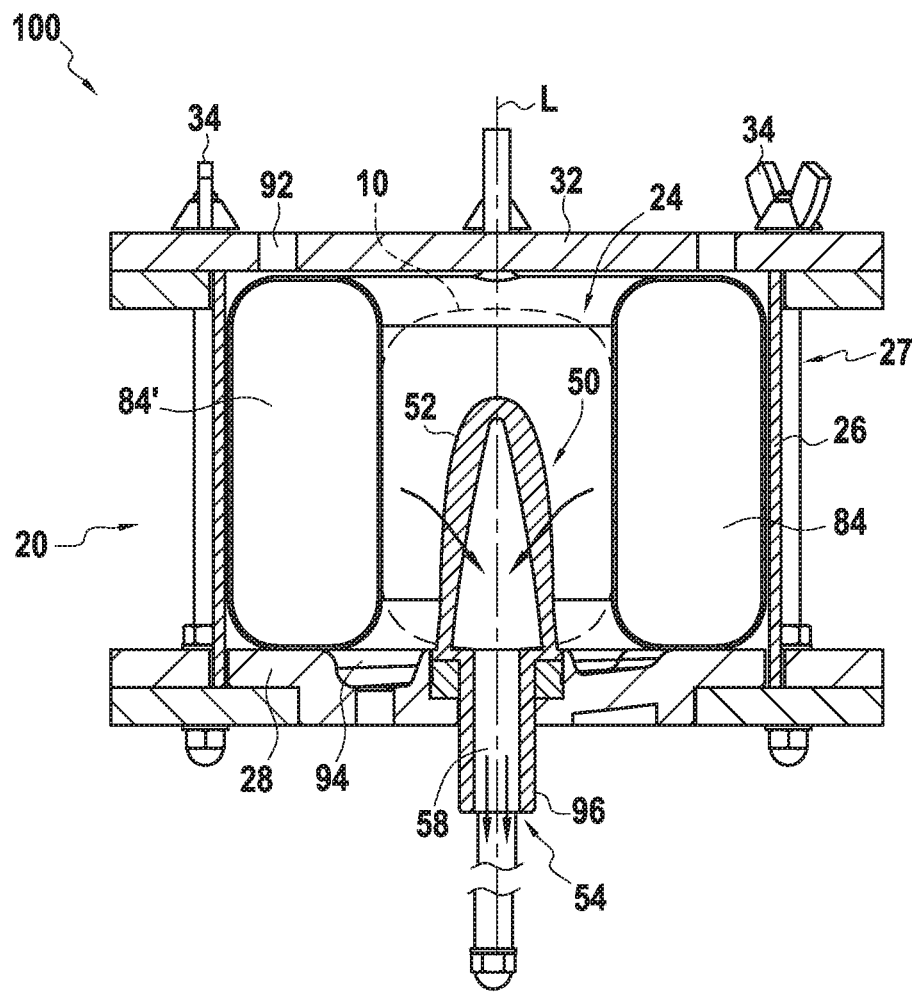
FIG. 4 is a diagrammatic section view of an example citrus juicer of the present disclosure, the extensible membrane being in an inflated state.

The extensible membrane 80 of the citrus juicer 100 of the present disclosure can thus take on a deflated state, as shown in FIG. 3 in which no fluid or a negligible quantity of fluid has been introduced into the extensible membrane by the inflation means 90, and an inflated state, as shown in FIG. 4, in which the inflation means 90 have introduced a significant quantity of fluid into the extensible membrane 80.

The inflation means 90 are configured to introduce any type of fluid into the extensible membrane 80, such as air or water. The inflation means 90 are connected to a fluid source, such as a source of gas or a source of water; it is also possible to devise a citrus juicer 100 in which the extensible membrane is inflated by mouth by the user or from any other fluid source.

The inflatable portions 84, 84' of the extensible membrane 80 extend over the peripheral partition 26 of the wall 22.

The citrus juicer 100 of the present disclosure is thus configured to enable the fluid contained in the produce for pressing 10 to be extracted.

To do this, the lid 32 is initially removed, as shown in FIG. 1, so as to uncover the opening 30 in order to enable the produce for pressing 10 to be introduced into the cavity 24.

When it is arranged inside the cavity 24, the produce for pressing 10 is surrounded by the extensible membrane 80, as shown in particular in FIG. 3, which is then in its deflated or partially inflated state, so as to facilitate introducing the produce for pressing 10 into the cavity 24.

While the produce for pressing 10 is being introduced into the cavity 24, the produce for pressing 10 is engaged on the first portion 52 of the cannula 50 so that a portion of the cannula 50 extends inside the produce for pressing 10, as shown in FIG. 3.

Thereafter, the lid 32 is positioned to cover the opening 30. Closure means 34 are then actuated to hold the lid 32 on the opening 30.

Thereafter, the inflation means 90 are actuated to introduce fluid into the extensible membrane 80 so as to cause it to pass from the deflated or partially inflated state to the inflated state; the inflatable portions 84 and 84' of the extensible membrane 80 then compress the produce for pressing 10, as shown in FIG. 4.

By way of non-limiting example, the lid 32 presents blocking means fastened on its inside surface in order to contribute to holding the produce for pressing 10 inside the volume defined by the extensible membrane 80.

The fluid contained in the produce for pressing 10 is then directed towards the first portion 52 of the cannula 50 and subsequently flows into the internal duct 58 until it reaches the second portion 54 of the cannula 50.

It can thus be understood that the increase in the volume of the extensible membrane 80 as a result of actuating the inflation means 90 serves to compress the produce for pressing 10 in order to extract a significant portion of the fluid it contains, or indeed all of it; by way of non-limiting example, the citrus juicer 100 of the present disclosure enables more than 40% of the fluid contained by the produce for pressing 10 to be extracted, preferably more than 60%, more preferably more than 80%, the fluid then being recovered outside the cavity 24 in the proximity of the second portion 54 of the cannula 50.

In the example shown in particular in FIG. 4, when it is in the inflated state, the extensible membrane 80 presents a section that is substantially constant; Without going beyond the ambit of the present disclosure, and as shown in particular in FIG. 7, it is possible to devise an extensible membrane having inflatable portions 184, 184' that present a non-constant section when the extensible membrane is in the inflated state, so as to be shaped to match the shape of the produce for pressing 10. The inflatable portions 184, 184' of the extensible membrane 80 can thus be shaped to present bottom and top ends each of section that is greater than their middle portion, so as to match the shape of produce for pressing that is substantially spherical.

After the produce for pressing 10 has been compressed in order to extract fluid therefrom, the closure means 34 are actuated so as to enable the lid 32 to be removed from the opening 30 in order to extract the produce for pressing 10 from the cavity 24, which produce is now emptied of a significant portion of the fluid that it contained.

As shown in the various figures, the citrus juicer 100 of the present disclosure also has fluid admission means 92 for admitting a fluid, such as water, into the cavity 24. By way of non-limiting example, the fluid admission means 92 comprise through openings formed in the lid 32.

Thus, after the produce for pressing 10 has been removed from the cavity 24, a fluid, such as water, is introduced into the cavity 24 in order to clean it. In order to avoid soiling the space surrounding the citrus juicer 100, the fluid admission means 92 may be capable of being actuated only once the lid 32 closes the opening 30 of the enclosure 20.

The citrus juicer 100 may optionally include an ultrasound emitter device 94 configured to emit ultrasound into the fluid that has been introduced into the cavity 24 by the fluid admission means 92, so as to contribute to cleaning said cavity 24.

By way of non-limiting example, the citrus juicer 100 also has rotation means 96 configured to cause the cannula 50 to rotate about its longitudinal axis L; the rotation means 96 thus facilitate engaging the produce for pressing 10 on the first portion 52 of the cannula 50 while it is being introduced into the cavity 24, so as to facilitate extracting fluid therefrom.

The citrus juicer 100 also has a support 40, specifically a tripod, extending from the bottom 28 of the wall 22 so as to facilitate stable installation and use of the citrus juicer 100.

Figure 5:
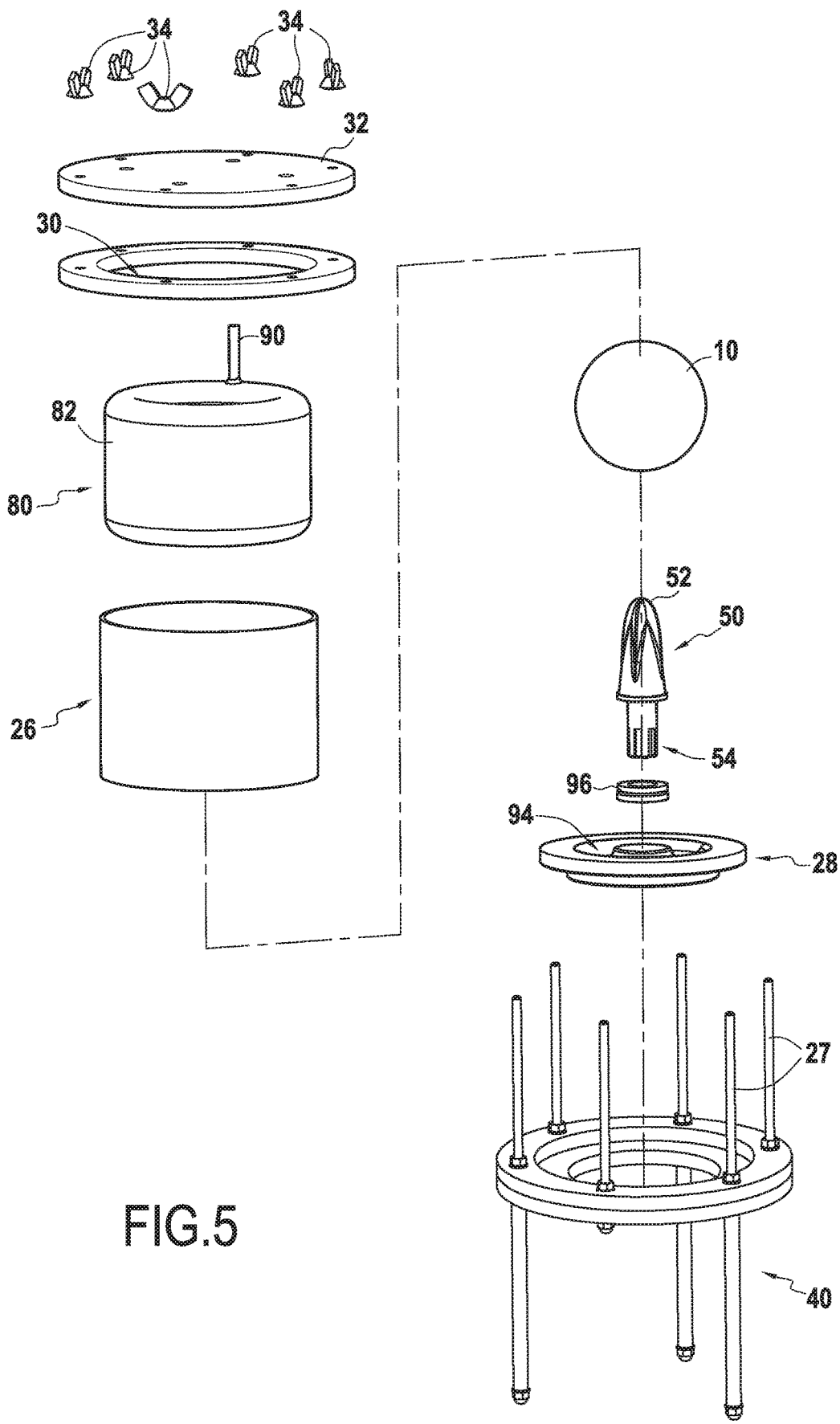
FIG. 5 is a diagrammatic exploded view of an example citrus juicer of the present disclosure.

As shown in particular in FIG. 5, the cannula 50 has an outside surface 56 with engagement projections 58 extending from the outside surface 56 in order to facilitate engaging the produce for pressing 10 on the first portion 52 of the cannula 50.

Figure 6A:
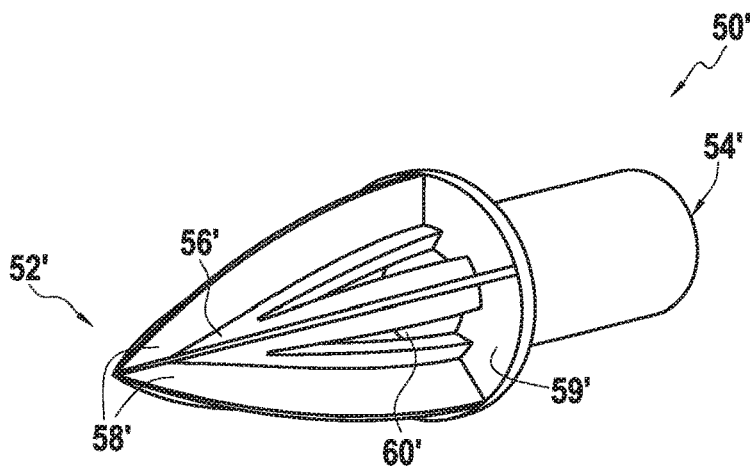
FIGS. 6A to 6C show other examples of a cannula for a citrus juicer of the present disclosure.
Figure 6B:
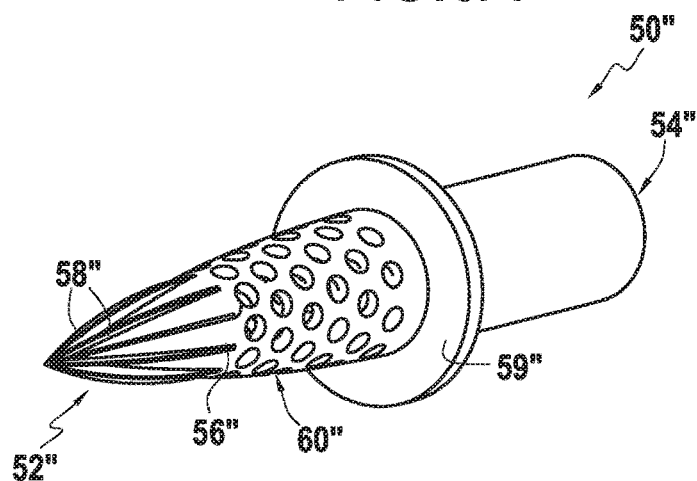
Figure 6C:
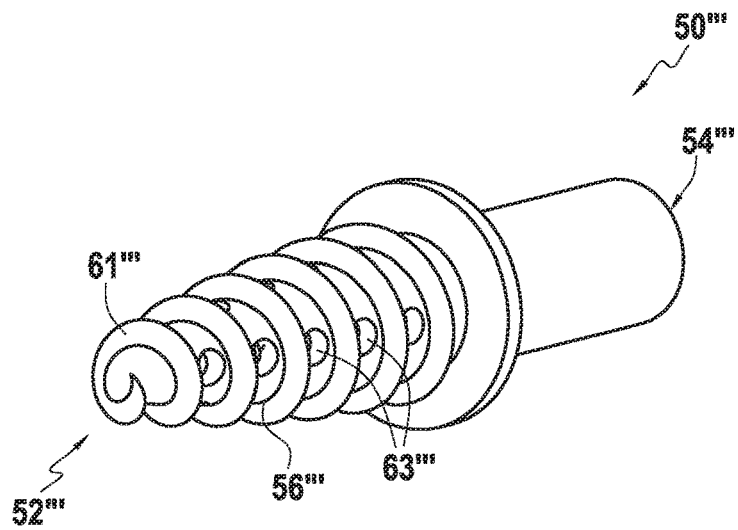

FIGS. 6A, 6B, and 6C show three alternative embodiments for the cannula 50', 50", 50''' configured to be fitted to the citrus juicer 100 of the present disclosure.

In the example shown in FIG. 6A, the first portion 52' of the cannula 50' has an outside surface 56'; in addition, the cannula 50' has an annular abutment 59' extending from the outside surface 56' of the cannula 50' and configured to limit the depth of engagement of the cannula 50' in the produce for pressing 10.

The cannula 50' also has engagement blades 58' extending from the annular abutment 59' along the outside surface 56'; the engagement blades 58', which constitute projections, thus facilitate engaging the produce for pressing 10 on the cannula 50', and also facilitate extracting fluid, by cutting through the flesh of the produce for pressing 10.

In addition, the cannula 50' has windows 60' configured to allow the fluid contained in the produce for pressing 10 to flow into the internal duct of the cannula 50'.

In the example shown in FIG. 6B, the cannula 50" also has an annular abutment 59", the first portion 52" having an outside surface 56".

The cannula 50" also has engagement blades 58", which constitute projections, extending along the outside surface 56" serving to facilitate engagement of the produce for pressing and extraction of its fluid; the cannula 50" also has a perforated portion 60" arranged between the first portion 52" and the annular abutment 59" to allow the fluid extracted from the produce for pressing 10 to flow into the internal duct of the cannula 50".

In the example shown in FIG. 6C, the first portion 52''' of the cannula 50''' presents an outside surface 56''' and an annular abutment 59'''; the cannula 50''' also has a helical surface 61''' extending from the outside surface 56''' to facilitate engagement of the produce for pressing and extraction of its fluid, in particular when one of the elements selected from the produce for pressing and the cannula is turned about the longitudinal axis L of the cannula.

In addition, the cannula 50''' has openings 63''' opening out into the internal duct to enable the fluid to be extracted from the produce for pressing 10.

FIGS. 8 to 18 show another embodiment of a citrus juicer 100 of the present disclosure.

In similar manner to the other embodiments, the citrus juicer 100 has an enclosure 20, e.g. of substantially cylindrical shape, having a wall 22 defining a cavity 24, the enclosure 20 also having an opening 30 to enable produce for pressing 10 to be introduced into the cavity 24.

This citrus juicer also has a cannula 50 with a first portion 52 arranged inside the enclosure and a second portion 54 arranged outside the enclosure, underneath it. The first and second portions include an internal duct 39 for discharging the juice that is extracted from the produce for pressing 10 outside the enclosure. The cannula also has orifices 37, shown in FIG. 10, through which the juice from the produce for pressing enters into the cannula. FIGS. 8 to 12 show one particular example of a cannula. Without going beyond the ambit of the present disclosure, it is equally possible to use any of the cannulas described above.

Furthermore, the cannula 50 shown in FIGS. 15 to 18 extends axially outside the enclosure beyond the opening 30. The top end 52a of the first portion 52 of the cannula is bullet-shaped, so as to facilitate engaging the produce for pressing on the cannula.

The first portion 52 of the cannula comprises a body 52b that extends between a base 52c and the bullet-shaped top end 52a, the body having orifices 37.

It can be understood that this shape serves to maximize the contact area between the cannula and the produce for pressing.

The body comprises a cylindrical cage 49 comprising a plurality of axial rods 51 that are spaced apart from one another, the rods extending over substantially the entire height of the cavity.

Figure 8:
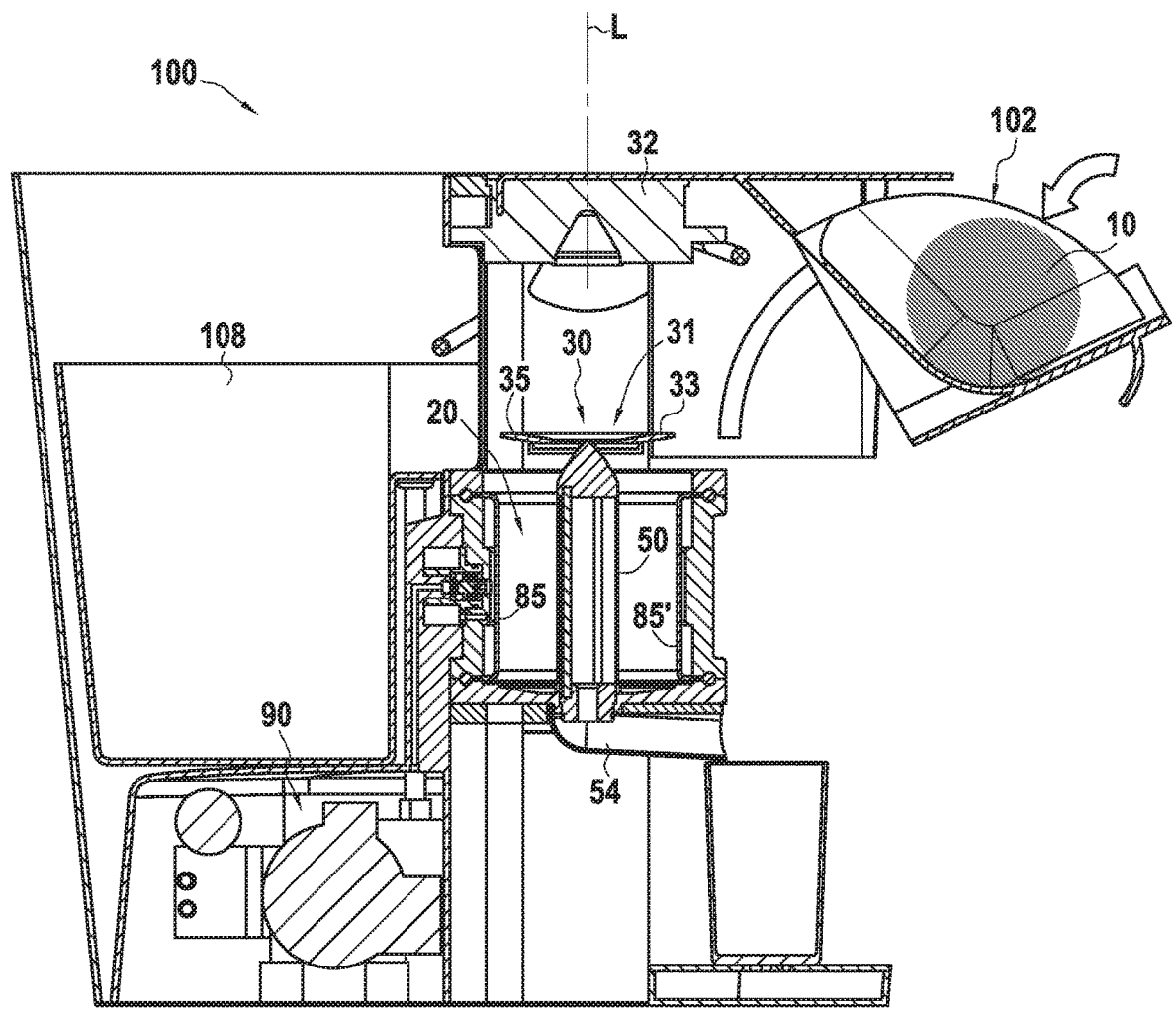
FIGS. 8 to 12 show various steps in the operation of another embodiment of the citrus juicer of the disclosure.
Figure 10:
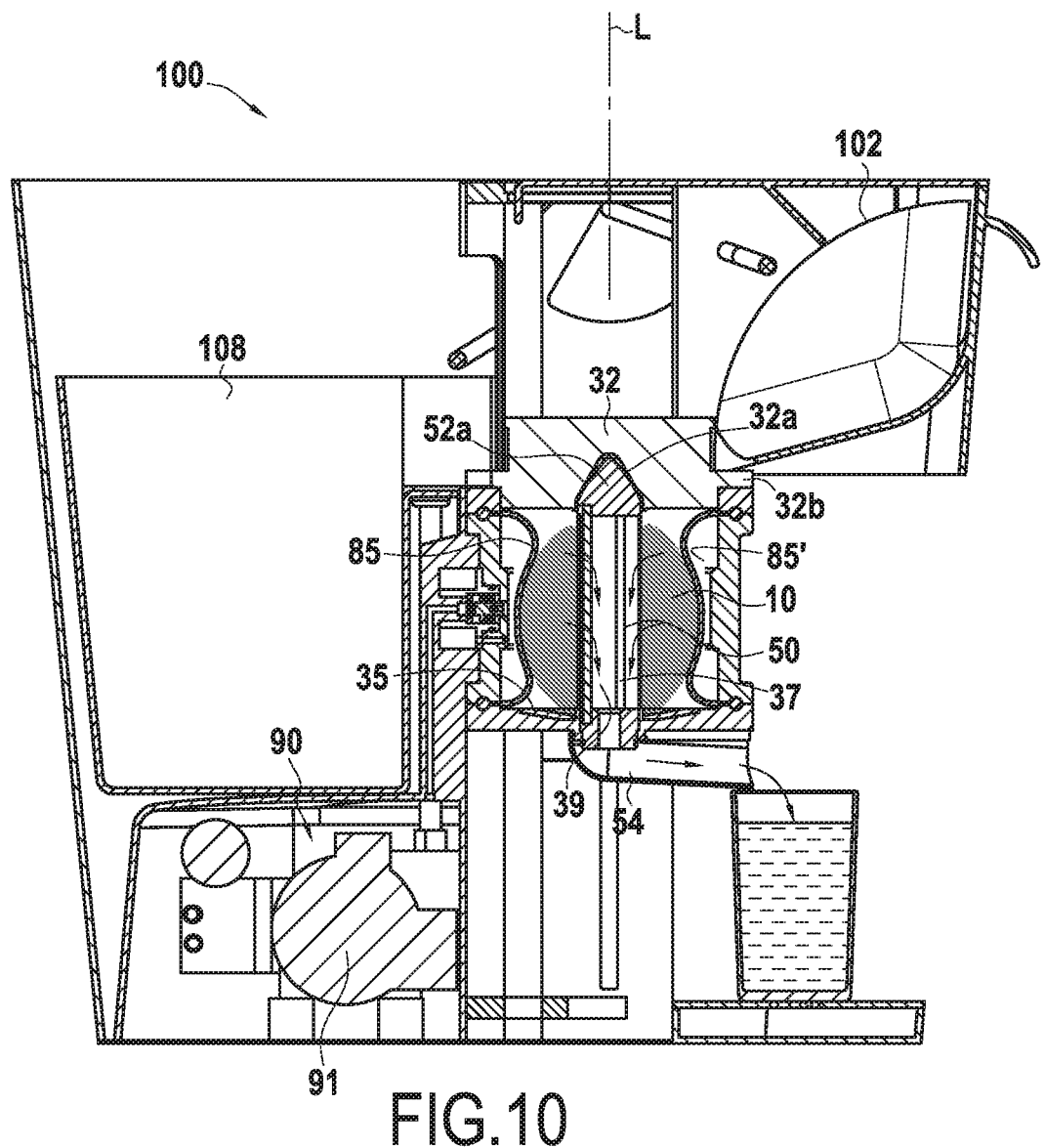

The citrus juicer 100 also has a movable lid 32 that can either occupy an open position, as shown in FIG. 8, in which the produce for pressing 10 can be introduced into the cavity 24, or a closed position, as shown in FIG. 10, in which the produce for pressing 10 is held inside the cavity 24. In this example, the lid is movable in a direction parallel to the longitudinal axis L of the cannula. In this example, the longitudinal axis L of the cannula is substantially vertical. For this purpose, the citrus juicer 100 includes a motor-driven device (not shown) that is arranged to drive the lid in translation. The motor-driven device is dimensioned so that the lid exerts a thrust force that is sufficient to engage the produce for pressing on the cannula while the lid is moving from its open position to its closed position.

In the closed position, the top end 52a of the cannula is engaged in a setback 32a arranged in the lid. It can thus be understood that the cannula passes axially through the pressed produce. This serves to maximize the working area between the cannula and the produce for pressing, thereby serving to improve the effectiveness with which juice is extracted.

Figure 11:
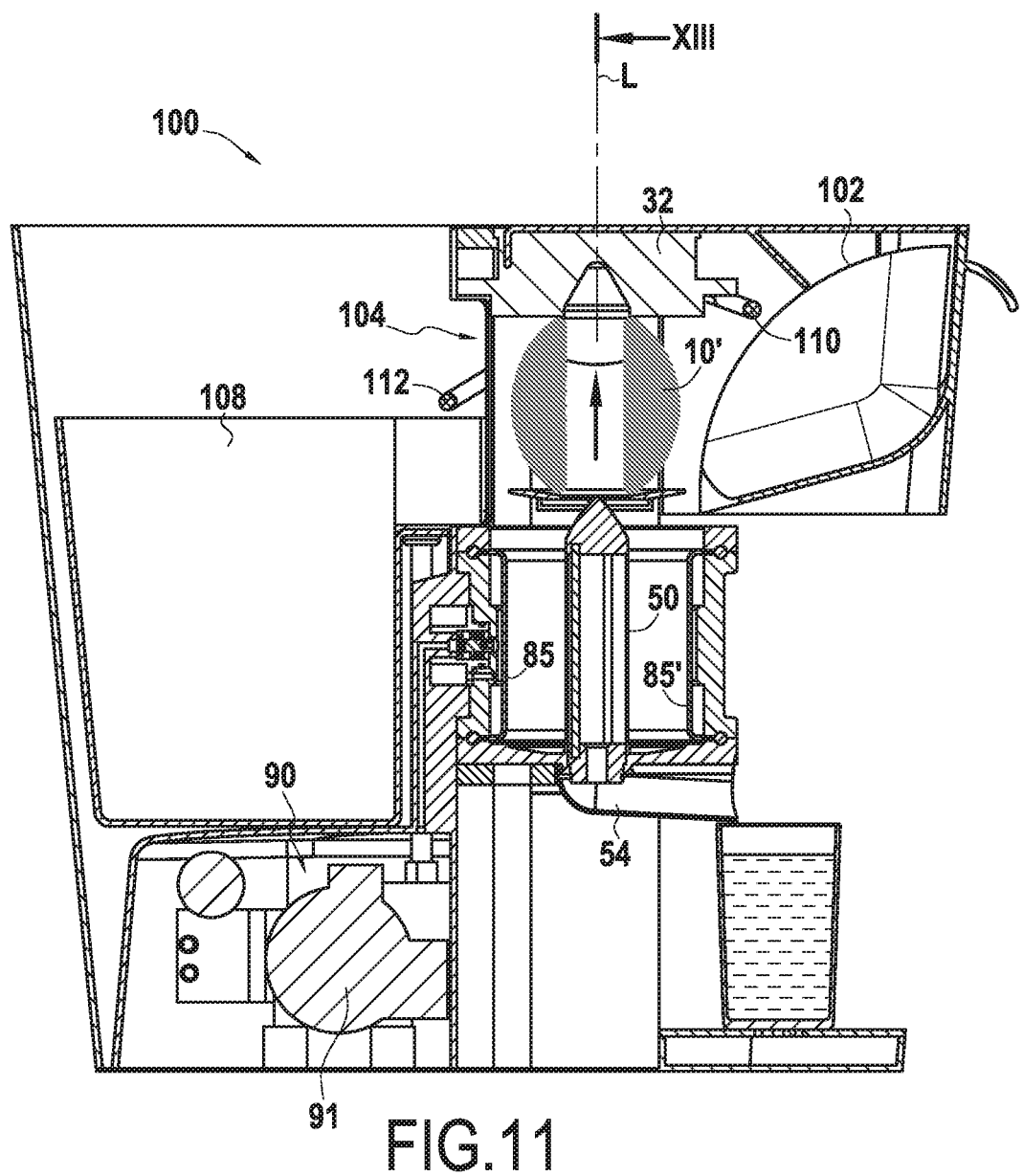

The citrus juicer 100 also has an ejector device 31 for discharging the pressed produce out from the cavity after the juice has been extracted. The ejector device 31 has a movable base 33 configured to receive a bottom portion of the produce for pressing 10. The movable base 33 is movable along the longitudinal axis L of the cannula. The movable base has an annular tray 35 arranged to surround the cannula. The annular tray is thus movable longitudinally along the cannula. While extracting juice, the annular tray 35 is arranged at the bottom of the cavity. As shown in FIG. 11, after the juice has extracted, the lid is opened and the movable base is moved towards the opening of the enclosure in order to eject the pressed produce out from the cavity.

Figure 9:
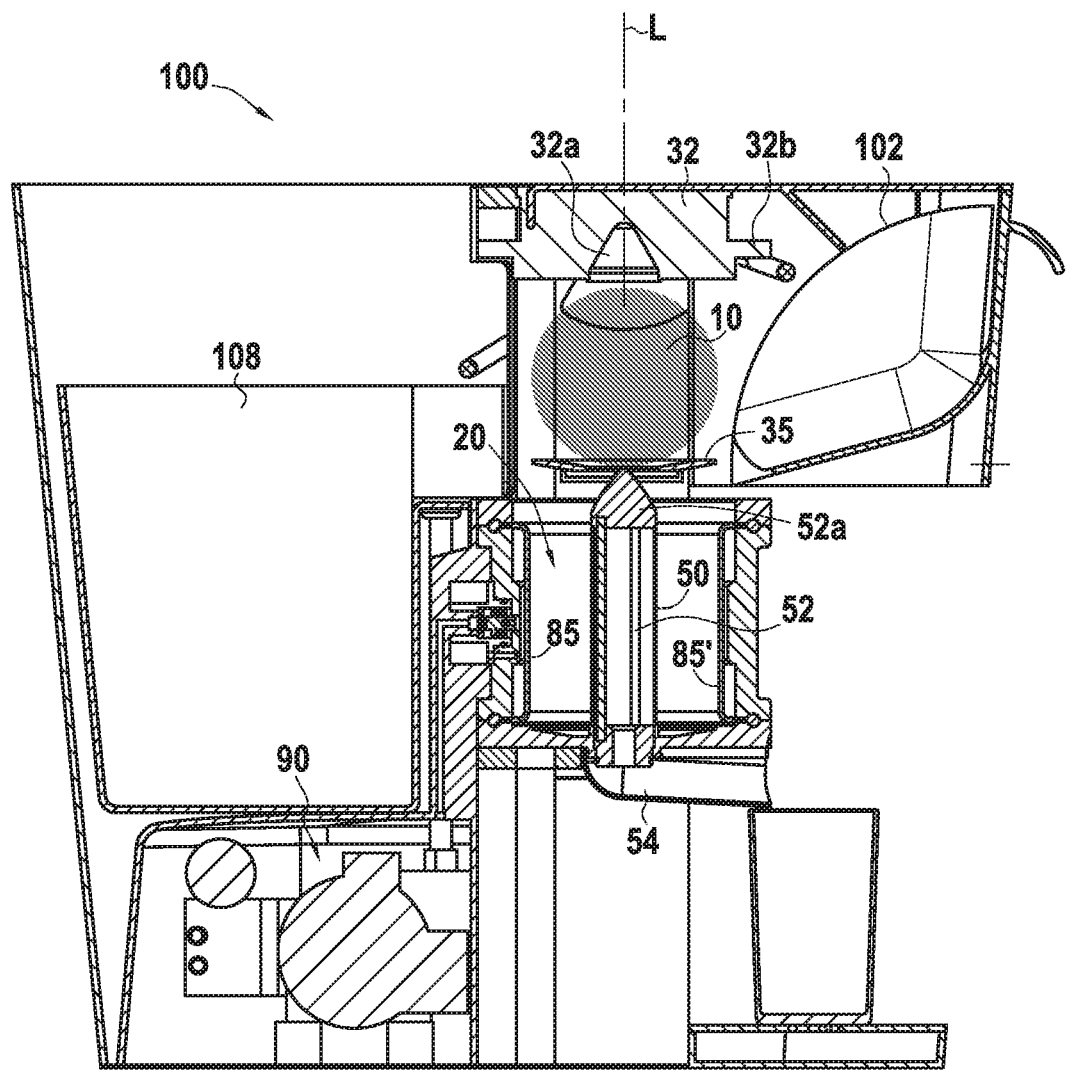

With reference to FIGS. 8 and 9, it can be seen that the ejector device 31 has a reception position for receiving produce for pressing being introduced into the citrus juicer, the ejector device being outside the cavity while it is in the reception position. In the reception position, the annular tray 35 is located a little above the top end of the cannula. In this reception position, the lid 32 is in its open position, at a distance from the opening of the enclosure.

The movable base 35 also has the function of guiding movement and engagement on the cannula 50. It can thus be understood that the movable base 33 and the movable lid 32 are moved in substantially synchronized manner so as to move the produce for pressing 10 towards the cavity 24 while pushing on the produce for pressing so that it becomes engaged on the cannula 50.

The citrus juicer 100 also has an introduction device 102 configured to enable the produce for pressing 10 to be introduced into the cavity.

By way of non-limiting example, the introduction device 102 comprises a hopper that is mounted to pivot about an axis, e.g. and in non-limiting manner, an axis that is substantially horizontal. The introduction device 102 can thus occupy a pick-up position as shown in FIG. 8 in which the produce for pressing 10 can be introduced into the introduction device 102. Thereafter, the introduction device 102 is pivoted so as to occupy a feed position shown in FIG. 9 in which the produce for pressing 10 is taken to the annular tray 33 of the ejector device while in its reception position, as shown in FIG. 9.

As explained above, the movable lid 32 is configured to make it possible, while it is moving from its open position to its closed position, to engage the produce for pressing 10 on the cannula 50. For this purpose, the lid 32 delivers downward vertical thrust on the produce for pressing, which then becomes engaged on the first portion of the cannula. The lid then closes the enclosure and the annular tray is to be found at the bottom of the cavity.

The citrus juicer also has a locking system 57 for closing the enclosure during the operation of inflating the extensible membrane 80. In this example, the locking system comprises catches 41 that take up positions above a collar 32b of the lid when the lid is in its closed position.

The cannula extends substantially parallel relative to the axis of the cylindrical shape defined by the cavity 24 so as to facilitate subsequent extraction of its fluid.

Furthermore, in similar manner to the above-described embodiments, the citrus juicer 100 has an extensible membrane 80 arranged in the cavity 24 and extending over the wall 22 so as to surround the produce for pressing 10.

By way of non-limiting example, the extensible membrane 80 has first and second extensible portions 85 and 85' fastened to the wall 22 so as to define a volume between the wall 22 and said first and second extensible portions 85 and 85'; the citrus juicer 100 also has inflation means 90, e.g. comprising, in non-limiting manner, a compressor 91 for enabling fluid to be introduced into said volume so as to move the first and second extensible portions 85 and 85' to compress the produce for pressing 10 that is arranged inside the cavity 24 so as to extract fluid therefrom via the cannula 50, as can be seen in particular in FIG. 10. The inflation pressure preferably lies in the range 2 bar to 5 bar. It can thus be seen in particular that the citrus juicer 100 also has a chute mounted on one of the longitudinal portions 54 of the cannula 50 in order to enable the fluid extracted from the produce for pressing 10 to flow into a receptacle, such as a glass.

The citrus juicer also has a mover device (not shown) for moving both the lid 32 and the annular tray of the movable base 33 of the ejector device together in a direction parallel to the longitudinal axis L of the cannula. The mover device is motor-driven by a gearmotor associated with a worm-screw. It thus serves to enable engagement of the produce for pressing on the cannula to be automated, and also its ejection from the enclosure.

The mover device is configured so that the movable base 33 is arranged at the bottom of the cavity when the lid is in the closed position, while the movable base is arranged at or above the opening 30 when the lid is in the open position.

After extracting fluid, the mover device is actuated so as to bring the lid into the open position together with the ejector device into the reception position, thereby having the effect of ejecting the pressed produce out from the enclosure.

The citrus juicer also has a discharge outlet 104 for the pressed produce 10' and a discharge device 106 for discharging the pressed produce 10' to the discharge outlet after being pressed.

Figure 12:
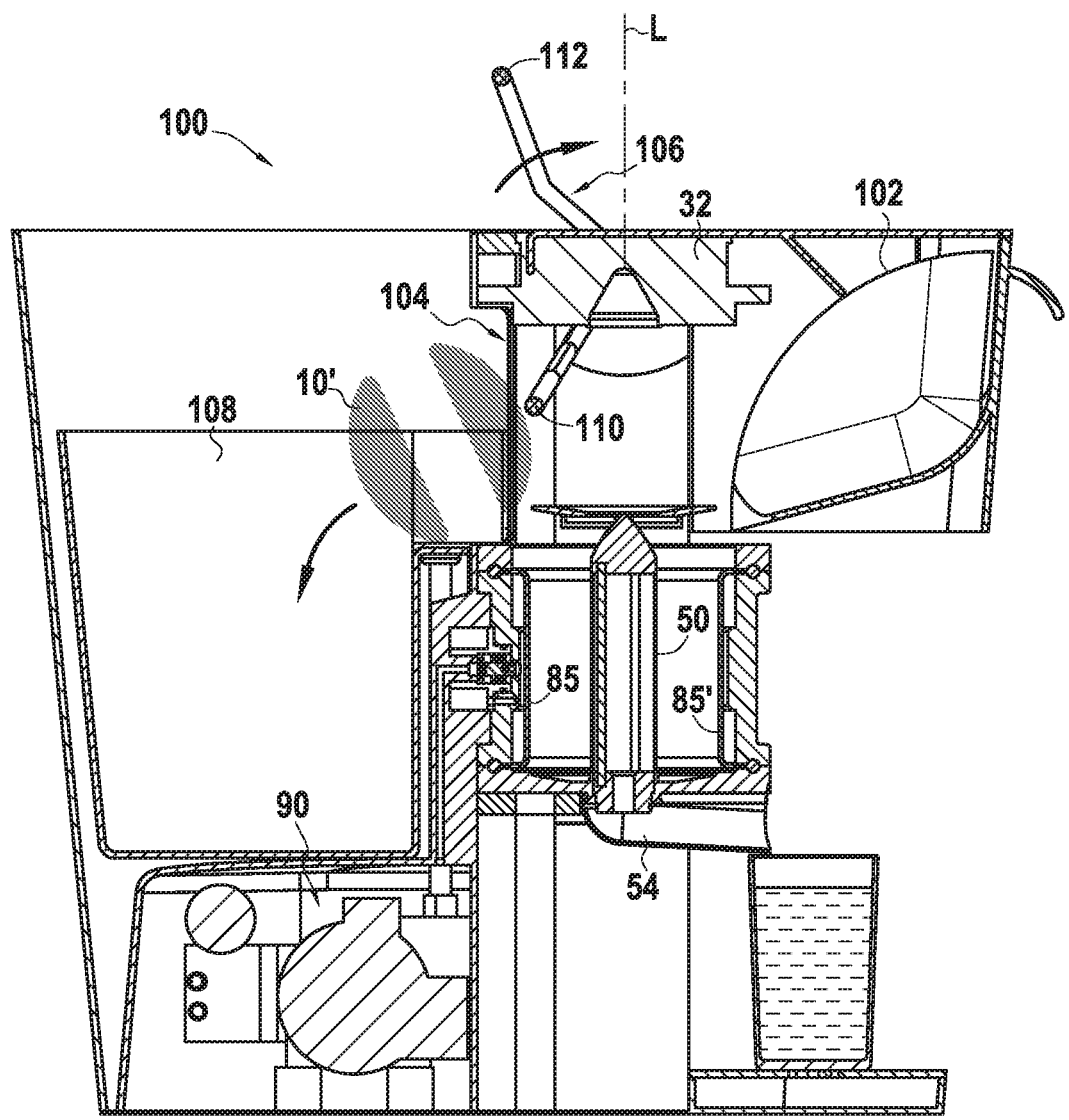
Figure 13:
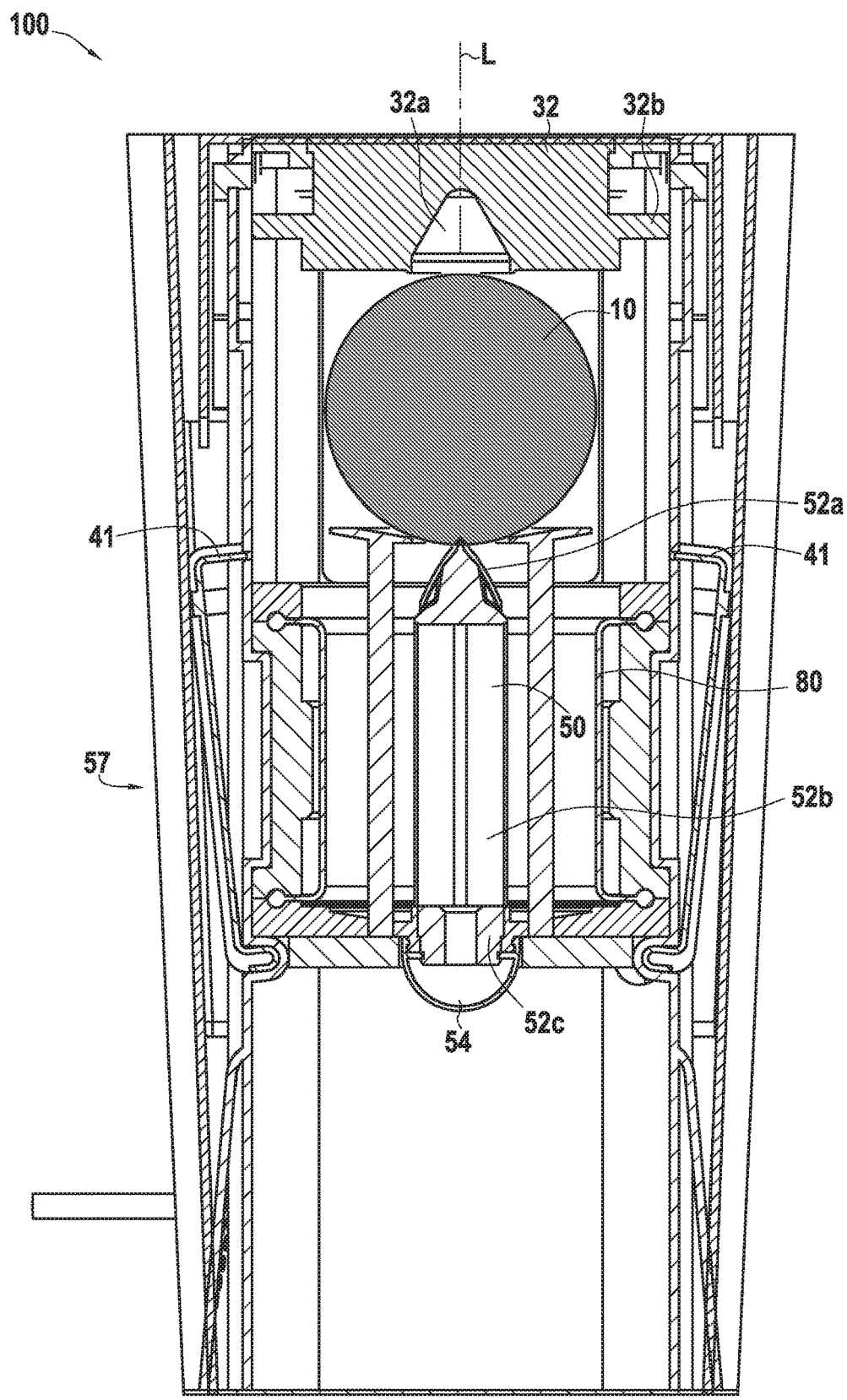
FIG. 13 is a face view in section of the FIG. 8 citrus juicer.
Figure 14:
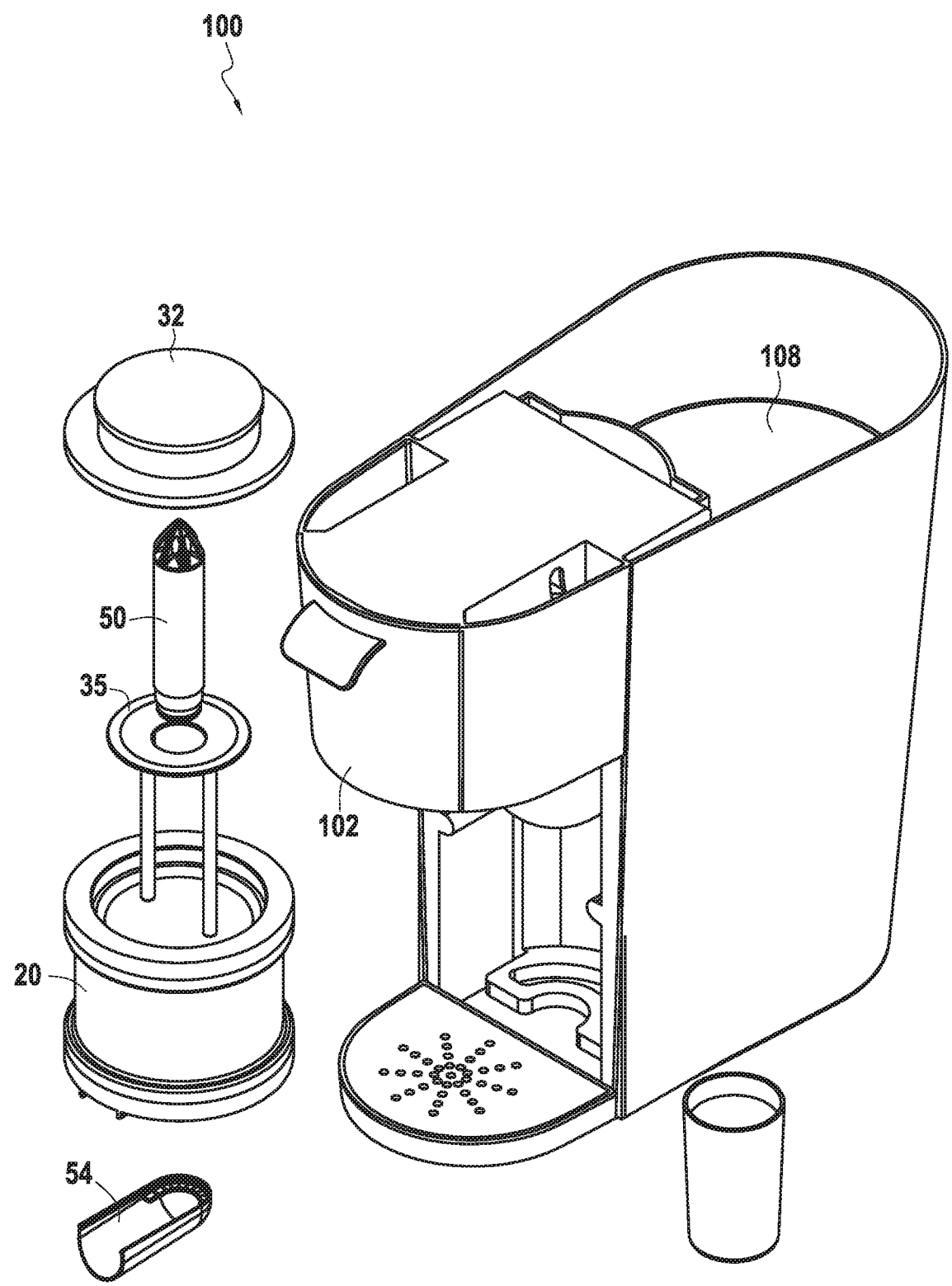
FIG. 14 is a partially-exploded perspective view of the FIG. 8 citrus juicer.
Figure 15:
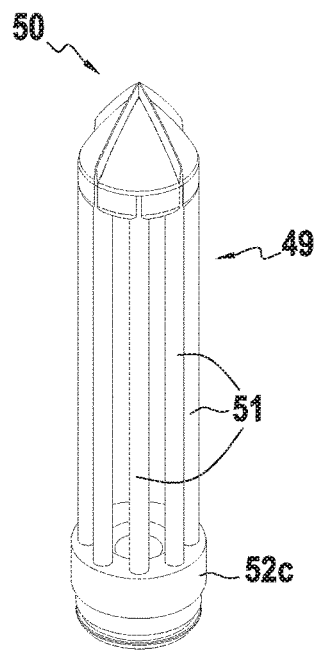
FIGS. 15 to 18 show the cannula of the FIG. 8 citrus juicer.
Figure 16:
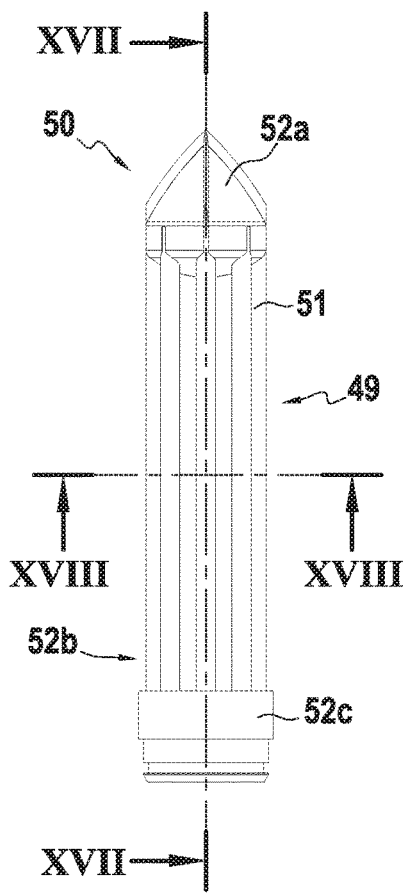
Figure 17:
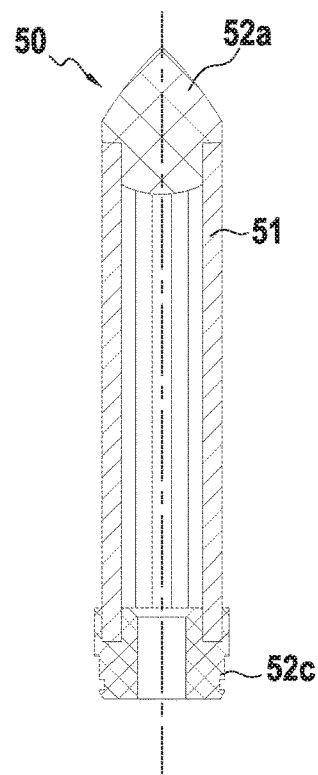
Figure 18:
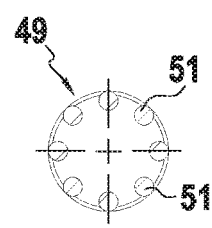

Furthermore, as shown in FIG. 12, the citrus juicer also has a removable container 108 for receiving the pressed produce 10' and the discharge outlet communicates with said container.

In order to discharge the pressed produce 10' to the container 108, the discharge device 106 has an arm 110 arranged to pivot between a first position and a second position.

As shown in FIG. 11, the discharge device also has an abutment 112 configured to block the discharge outlet 104 while the arm is in its first position, said abutment 112 being retracted when the arm is in its second position. The function of this abutment is to prevent the produce for pressing from dropping into the container while it is being introduced into the citrus juicer. It can be understood that the pivoting of the arm 110 is accompanied by the abutment being retracted, whereby the pressed produce is pushed into the container.

The above description is given by way of example, and is therefore not limiting on the disclosure.

In particular, although particularly adapted to the field of extracting juice from fruits or vegetables, the disclosure can equally well be used for extracting the fluid contained in any other type of produce in effective and accurate manner.

Even though some features, concepts or aspects of the embodiments may be described herein as being a preferred (more or less) arrangement or method, or an advantageous arrangement or method, such description is not intended to suggest that such feature or features are required or necessary unless expressly so stated.

The invention claimed is:

1. A citrus juicer comprising:
    an enclosure having a wall defining a cavity for produce for pressing containing a fluid, the cavity having an opening formed in the wall for introducing the produce for pressing into the cavity;
    a cannula extending through the wall of the enclosure, the cannula having a first portion arranged inside the cavity and configured to be engaged in the produce for pressing, and a second portion arranged outside the cavity, the cannula further including an internal duct extending in the first and second portions, the cannula being stationary with regard to the enclosure; and
    an extensible membrane arranged in the cavity and extending over all or part of the wall so as to surround the produce for pressing arranged inside the cavity, and an inflation device configured to inflate the extensible membrane so as to compress the produce for pressing engaged on the first portion of the cannula in order to extract the fluid out from the cavity via the internal duct of the cannula;

wherein the enclosure further comprises:

a lid shaped to close the opening so as to close the cavity, the lid being movable between an open position in which the opening is open for introducing the produce for pressing in the cavity or discharging the pressed produce out of the cavity, and a closed position in which the opening is closed by the lid; and an ejector device for discharging the pressed produce out from the cavity through the opening, said ejector device including a movable base that is movable in the cavity along the cannula along the longitudinal axis of the cannula, between a bottom of the cavity and the opening.

2. The citrus juicer according to claim 1, wherein the wall comprises a peripheral partition and a bottom, the cannula extending through the bottom.

3. The citrus juicer according to claim 1, wherein the cavity is cylindrical in shape.

4. The citrus juicer according to claim 1, wherein the extensible membrane comprises a body of cylindrical shape configured to surround the produce for pressing when arranged in the cavity.

5. The citrus juicer according to claim 4, wherein the extensible membrane, when inflated, presents a section that is not constant, being shaped to match the shape of the produce for pressing.

6. The citrus juicer according to claim 1, wherein the wall includes a peripheral partition and the extensible membrane comprises an inflatable portion extending over all or part of the peripheral partition.

7. The citrus juicer according to claim 6, wherein the extensible membrane comprises at least two inflatable portions configured to extend over two distinct portions of the peripheral partition of the wall.

8. The citrus juicer according to claim 1, further including a fluid admission device for admitting a fluid in order to introduce said fluid into the cavity.

9. The citrus juicer according to claim 8, further including an ultrasound emitter device configured to emit ultrasound into the fluid contained in the cavity so as to clean said cavity.

10. The citrus juicer according to claim 1, wherein the cannula presents a longitudinal axis, the citrus juicer further including rotation means configured to cause the cannula to turn about its longitudinal axis.

11. The citrus juicer according to claim 1, wherein the first portion of the cannula has an outside surface, the cannula further including a projection extending on the outside surface of the first portion.

12. The citrus juicer according to claim 1, wherein the movable base comprises an annular tray arranged to surround the cannula.

13. The citrus juicer according to claim 1, further including a mover device for moving the lid together with the movable base of the ejector device in a direction parallel to the longitudinal axis of the cannula.

14. The citrus juicer according to claim 13, wherein the mover device is configured so that the movable base is arranged at the bottom of the cavity when the lid is in the closed position, while the movable base is arranged at or above the opening when the lid is in the open position.

15. The citrus juicer according to claim 1, further including a discharge outlet for discharging the pressed produce and a discharge device for discharging the pressed produce to the discharge outlet after the pressed produce has been pressed.

16. The citrus juicer according to claim 15, further including a removable container for receiving the pressed produce, and wherein the discharge outlet communicates with said container.

17. The citrus juicer according to claim 15, wherein the discharge device comprises an arm arranged to pivot between a first position and a second position.

18. The citrus juicer according to claim 17, wherein the discharge device further comprises an abutment configured to block the discharge outlet when the arm is in the first position, said abutment being retracted when the arm is in the second position.

19. The citrus juicer according to claim 1, wherein the cannula extends axially outside the enclosure beyond the opening.

20. The citrus juicer according to claim 1, wherein the first portion of the cannula presents a top end that is bullet-shaped.

21. The citrus juicer according to claim 20, wherein, when in the closed position, the top end of the cannula is engaged in a setback provided in the lid.

22. The citrus juicer according to claim 20, wherein the first portion of the cannula comprises a body that extends between a base and the bullet-shaped top end, the body being provided with orifices.

23. The citrus juicer according to claim 22, wherein the body comprises a cylindrical cage provided with a plurality of mutually spaced-apart axial rods, the rods extending over the height of the cavity.

24. The citrus juicer according to claim 1, wherein the ejector device presents a reception position for receiving produce for pressing introduced into the citrus juicer, at least a portion of the ejector device being located outside the cavity when the ejector device is in the reception position.

25. The citrus juicer according to claim 24, further comprising a pivoting introduction device for introducing the produce for pressing into the body of the citrus juicer.

26. The citrus juicer according to claim 1, further comprising a locking system for locking the lid in the closed position.

27. A citrus juicer comprising:

an enclosure having a wall defining a cavity for receiving a fruit containing a fluid, and a top opening formed in the wall for introducing the fruit into the cavity;

a cannula extending through the wall of the enclosure, the cannula having a first portion arranged inside the cavity and configured to be engaged in the fruit, and a second portion arranged outside the cavity, the cannula further including an internal duct extending in the first and second portions, the cannula being stationary with regard to the enclosure; and an extensible membrane arranged in the cavity and extending over all or part of the wall so as to surround the fruit arranged inside the cavity, and an inflation device configured to inflate the extensible membrane so as to compress the fruit engaged on the first portion of the cannula in order to extract downwardly the fluid out from the cavity via the internal duct of the cannula;

wherein the enclosure further comprises:

a lid shaped to close the top opening so as to close the cavity, the lid being movable between an open position in which the enclosure is open and a closed position in which the opening is closed by the lid; and an ejector device for discharging the pressed fruit out from the cavity through the top opening, said ejector device including a movable base that is movable in the cavity along the cannula along the longitudinal axis of the cannula, between a bottom of the cavity and the top opening, the movable base having an aperture through which the cannula passes.

\* \* \* \* \*